（12）United States Patent
Ma et al.

(10) Patent No.: US 9,914,151 B2
(45) Date of Patent: Mar. 13, 2018

(54) METHOD OF APPLYING ADHESIVE TO AN OUTER CIRCUMFERENTIAL SURFACE OF A CYLINDRICAL COMPRESSOR LINER AND AN ADHESIVE APPLICATOR APPARATUS THEREFOR

(71) Applicant: Bendix Commercial Vehicle Systems LLC, Elyria, OH (US)

(72) Inventors: Chenhao Ma, Olmsted Township, OH (US); Gene E Gilbert, Elyria, OH (US); John J Mayer, Westlake, OH (US); Robert M Chipgus, Medina, OH (US); Ronald A Tamunday, Lakewood, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 336 days.

(21) Appl. No.: 14/882,577

(22) Filed: Oct. 14, 2015

(65) Prior Publication Data

US 2017/0106404 A1 Apr. 20, 2017

(51) Int. Cl.
*B05D 1/28* (2006.01)
*B05D 1/18* (2006.01)
*C09J 4/00* (2006.01)
*B05C 1/08* (2006.01)

(52) U.S. Cl.
CPC ............... *B05D 1/18* (2013.01); *B05C 1/08* (2013.01); *B05D 1/28* (2013.01); *C09J 4/00* (2013.01)

(58) Field of Classification Search
CPC ................................ B05D 1/28; B05C 11/025
See application file for complete search history.

(56) References Cited

U.S. PATENT DOCUMENTS

| 3,023,121 | A | * | 2/1962 | Dyar | ..................... B24D 18/00 427/184 |
| 4,357,896 | A | | 11/1982 | Feldkamper | |
| 4,848,269 | A | | 7/1989 | Zimmer | |
| 4,999,912 | A | | 3/1991 | Cuccato | |

(Continued)

OTHER PUBLICATIONS

Henckel Technologies, "Loctite 640," Technical Data Sheet, Oct. 2005, 3 pages, Henckel Technologies, USA.

(Continued)

*Primary Examiner* — Xiao S Zhao
(74) *Attorney, Agent, or Firm* — Cheryl L. Greenly; Brian E. Kondas; Eugene E. Clair

(57) ABSTRACT

An apparatus is provided for applying adhesive to a compressor liner having a longitudinal central axis. A first roller has a longitudinal central axis and has an outer circumferential surface which is immersed in adhesive in an adhesive sink. A second roller has a longitudinal central axis and is radially spaced apart from the first roller. The second roller has same outer diameter as the first roller and has an outer circumferential surface which is not immersed in adhesive in the adhesive sink. The first and second rollers cooperate to support the compressor liner for rotation about its longitudinal central axis. A drive mechanism includes a constant speed drive for rotating the first and second rollers about their longitudinal central axes at a constant rotational speed to allow a consistent weight and uniform layer of adhesive to be transferred from the first roller to the compressor liner.

22 Claims, 7 Drawing Sheets

(56) References Cited

U.S. PATENT DOCUMENTS

| | | | |
|---|---|---|---|
| 5,549,751 A | | 8/1996 | Brinkmeier |
| 5,641,378 A | | 6/1997 | Luhman |
| 5,666,725 A | * | 9/1997 | Ward .................. B23P 6/00 29/888.011 |
| 7,018,471 B2 | | 3/2006 | Duwendag |
| 8,695,530 B2 | | 4/2014 | Sun |
| 2009/0320783 A1 | * | 12/2009 | Krogmann ......... B22D 19/0009 123/193.2 |
| 2015/0053132 A1 | | 2/2015 | Huang |

OTHER PUBLICATIONS

Bendix Commercial Vehicle Systems LLC, "Bendix BA-921 Compressor: Standard and Closed Room," BW2369 Service Data Sheet, Oct. 2007, Bendix Commercial Vehicle Systems LLC, Elyria Ohio USA.

* cited by examiner

US 9,914,151 B2

METHOD OF APPLYING ADHESIVE TO AN OUTER CIRCUMFERENTIAL SURFACE OF A CYLINDRICAL COMPRESSOR LINER AND AN ADHESIVE APPLICATOR APPARATUS THEREFOR

BACKGROUND

The present application relates to cylindrical compressor liners for compressor crankcase assemblies for pneumatic air brake systems, and is particularly directed to a method of applying adhesive to an outer circumferential surface of a cylindrical compressor liner and an adhesive applicator apparatus therefor.

A compressor crankcase assembly for a pneumatic air brake system has components such as a crankcase and piston which are traditionally made of cast iron. An example of such a compressor design may include the design of a Bendix® BA-921® Compressor commercially available from Bendix Commercial Vehicle Systems LLC located in Elyria, Ohio. More recently, however, some compressor crankcases are made of aluminum to reduce the weight of the compressor and to save energy in transportation. Cast aluminum crankcases allow for reduction in weight. However, the specific heat and the heat capacity of aluminum are much greater than that of traditional crankcase materials. Cooling remains a challenge to dissipate the heat generated by compressors, particularly in compressor crankcase assemblies that have components made of aluminum or aluminum alloys. It would be desirable to overcome drawbacks of known compressor crankcase assemblies.

SUMMARY

In accordance with one embodiment, an apparatus and corresponding method are provided for applying adhesive to an outer circumferential surface of a cylindrical compressor liner having a longitudinal central axis. The apparatus comprises an adhesive sink filled with adhesive. The apparatus further comprises a first roller having a longitudinal central axis and having an outer circumferential surface which is immersed in the adhesive in the adhesive sink. The apparatus also comprises a second roller having a longitudinal central axis and radially spaced apart from the first roller and having a same outer diameter as the first roller and having an outer circumferential surface which is not immersed in the adhesive in the adhesive sink. The first and second rollers cooperate to support the compressor liner for rotation about its longitudinal central axis during operation of the apparatus. The apparatus further comprises a drive mechanism including a constant speed drive portion for rotating the first and second rollers about their longitudinal central axes at a constant rotational speed to allow a consistent weight and uniform layer of adhesive to be transferred from the outer circumferential surface of the first roller to the outer circumferential surface of the compressor liner as the first and second rollers are being rotated about their longitudinal central axes at the constant rotational speed.

In accordance with another embodiment, an apparatus and corresponding method are provided for applying adhesive to an outer circumferential surface of a cylindrical compressor liner. The apparatus comprises an adhesive sink filled with adhesive. The apparatus further comprises a first roller having a longitudinal central axis and having an outer circumferential surface which is immersed in the adhesive in the adhesive sink. The apparatus also comprises a second roller having a longitudinal central axis and radially spaced apart from the first roller and having a same outer diameter as the first roller and having an outer circumferential surface which is not immersed in the adhesive in the adhesive sink. The first and second rollers cooperate to support the compressor liner for rotation about its longitudinal central axis during operation of the apparatus. The apparatus further comprises a drive mechanism including a synchronizing drive portion for synchronizing rotation of the first and second rollers about their longitudinal central axes in the same rotational direction to allow a consistent weight and uniform layer of adhesive to be transferred from the outer circumferential surface of the first roller to the outer circumferential surface of the compressor liner.

In accordance with yet another embodiment, an apparatus and corresponding method are provided for applying adhesive to an outer circumferential surface of a cylindrical compressor liner having a longitudinal central axis. The apparatus comprises a holder mechanism for supporting the compressor liner for rotation about its longitudinal central axis. The apparatus further comprises an electrical drive mechanism for rotating the compressor liner at a constant rotational speed about its longitudinal central axis. The apparatus also comprises an applicator mechanism for applying an adhesive onto the outer circumferential surface of the compressor liner as the compressor liner is rotating about its longitudinal central axis. The apparatus further comprises a roller mechanism for spreading the applied adhesive on the outer circumferential surface in a manner to apply a consistent weight and uniform layer of adhesive to the outer circumferential surface while the applicator mechanism applies adhesive onto the outer circumferential surface and the electrical drive mechanism rotates the compressor liner at the constant rotational speed about its longitudinal central axis.

In accordance with still another embodiment, an apparatus and corresponding method are provided for applying adhesive to an outer circumferential surface of a cylindrical compressor liner having a longitudinal central axis. The apparatus comprises an adhesive source. The apparatus further comprises a roller having a longitudinal central axis parallel to the longitudinal central axis of the compressor liner and for spreading adhesive from the adhesive source on the outer circumferential surface of the compressor liner to provide a consistent weight and uniform layer of adhesive to the outer circumferential surface of the compressor liner when the compressor liner is rotated at a constant rotational speed about its longitudinal central axis. The roller has an outer circumferential surface having a central portion with a stepped groove formed therein. Thickness of the uniform layer of adhesive provided to the outer circumferential surface of the compressor liner varies as a function of depth of the stepped groove formed in the central portion of the outer circumferential surface of the roller.

DETAILED DESCRIPTION

Figure 1:
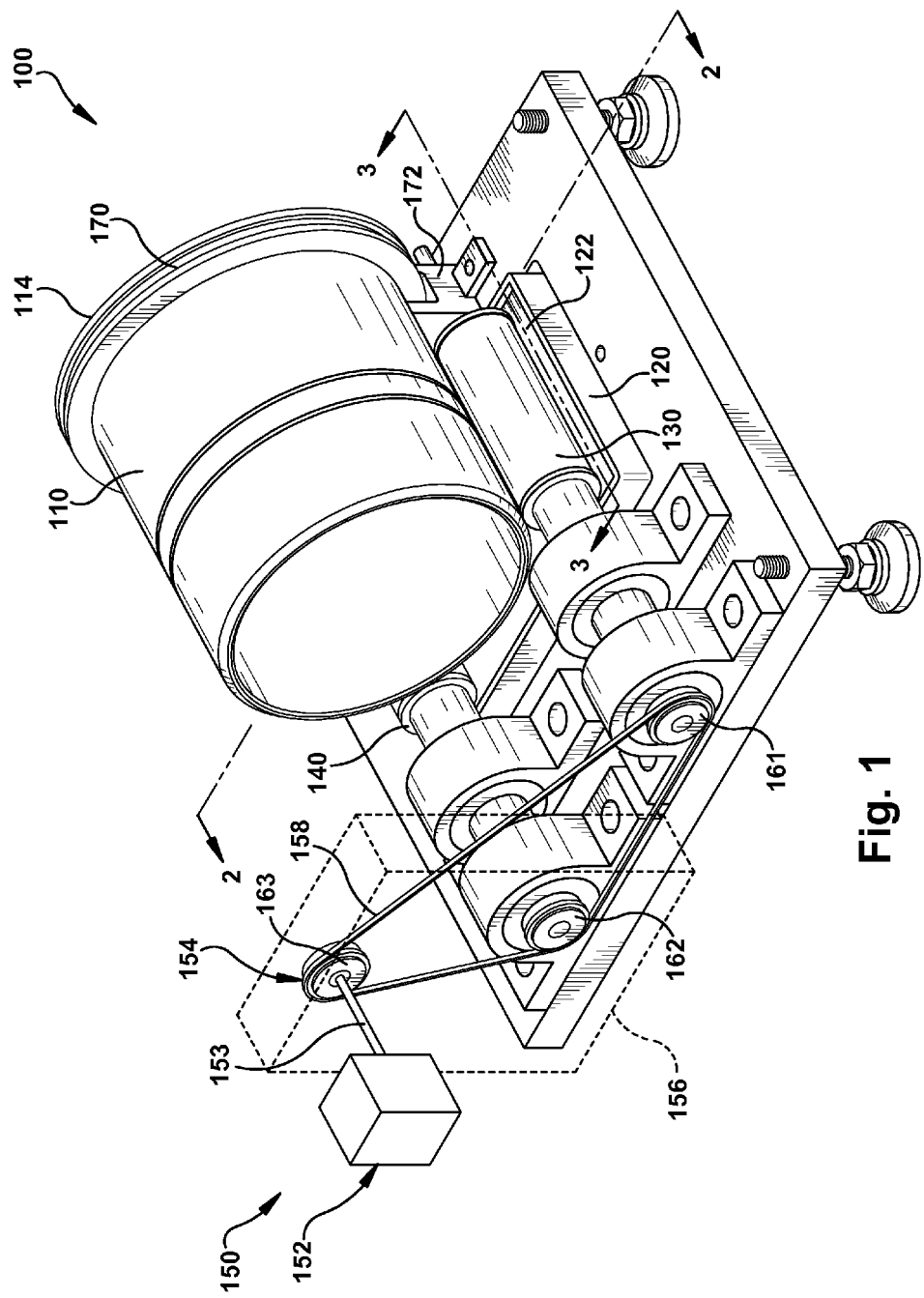
FIG. 1 is a perspective view of an adhesive applicator apparatus for applying adhesive to an outer circumferential surface of a cylindrical compressor liner, and constructed in accordance with an embodiment.
Figure 2:
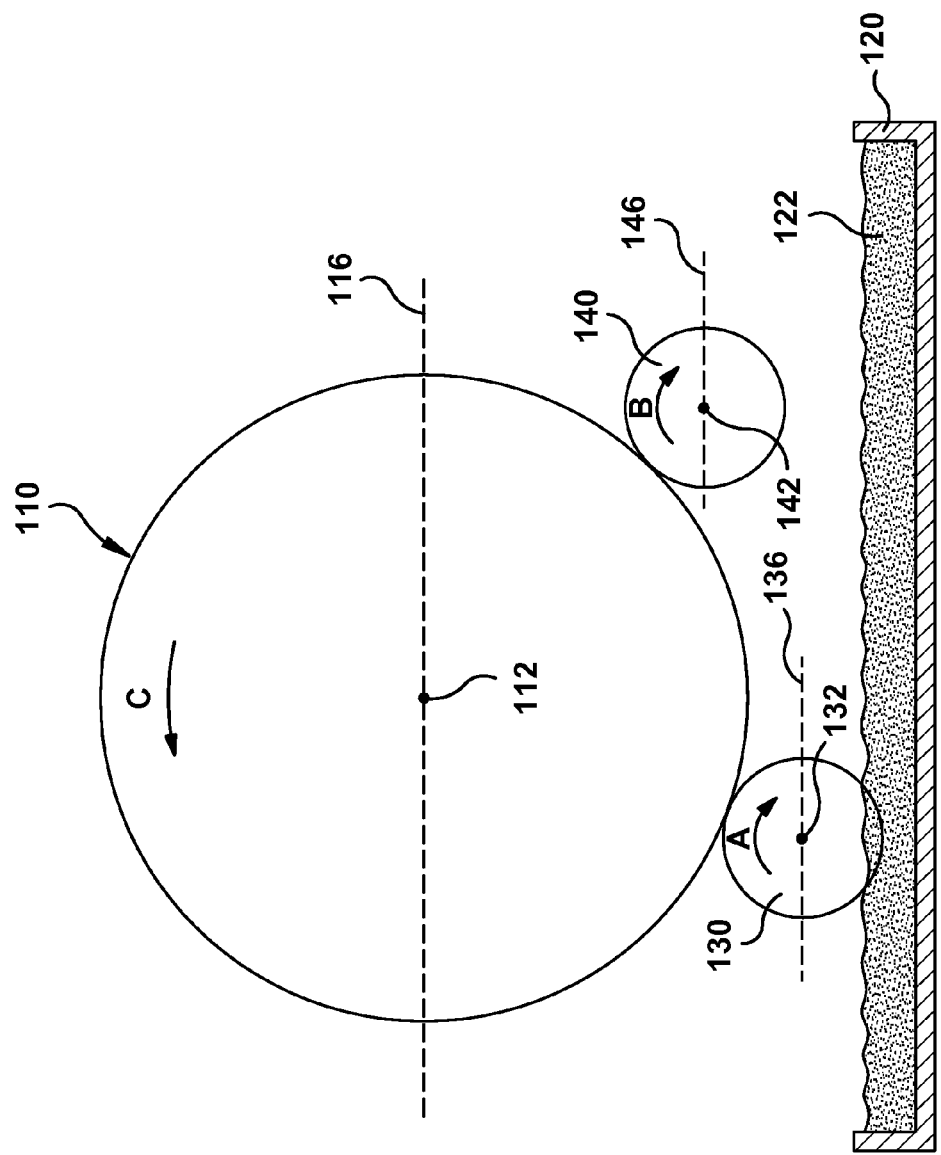
FIG. 2 is a sectional view, taken approximately along line 2-2 shown in FIG. 1, and showing parts of the adhesive applicator apparatus.
Figure 3:
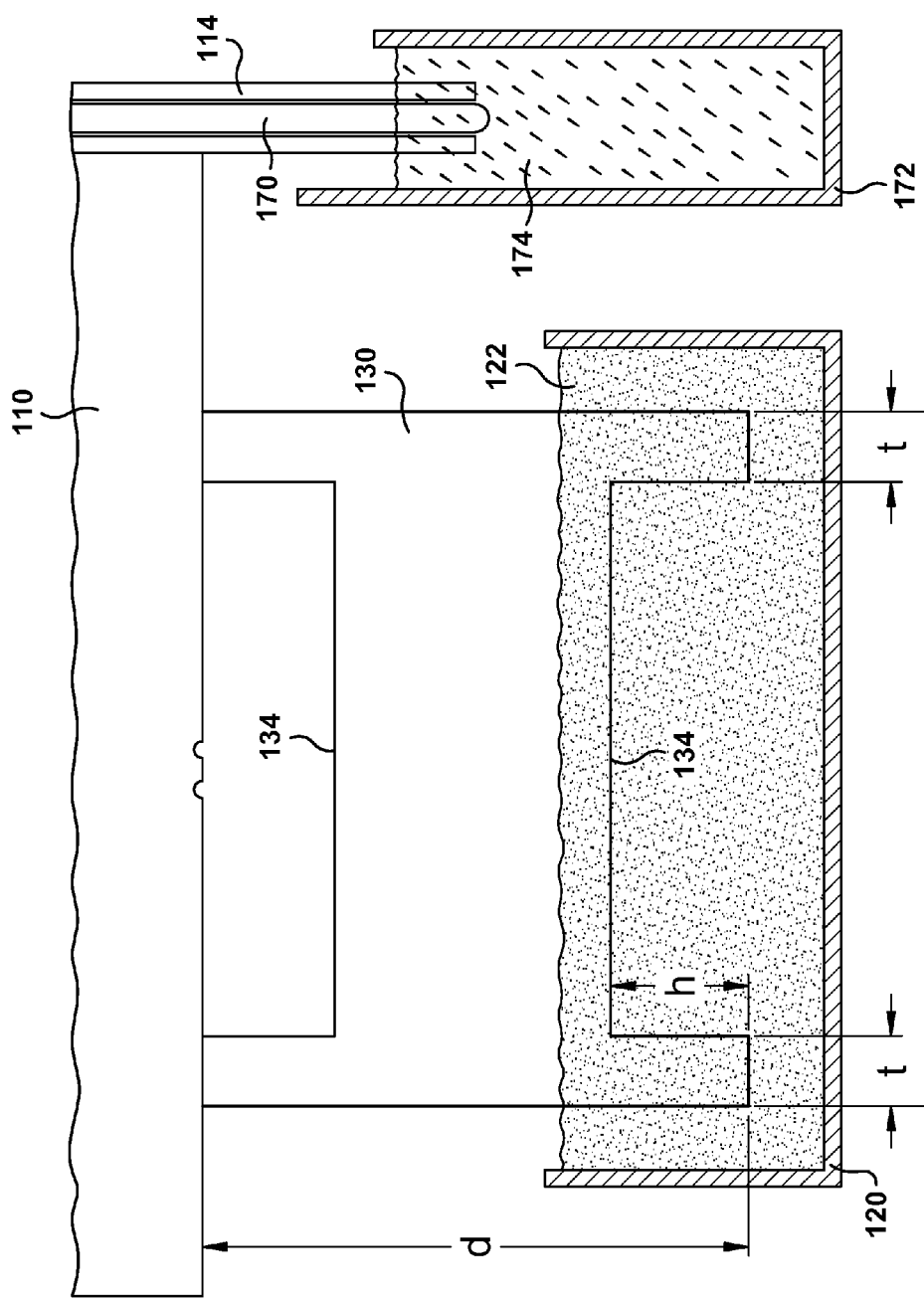
FIG. 3 is a sectional view, taken approximately along line 3-3 shown in FIG. 1, and showing parts of the adhesive applicator apparatus.

Referring to FIGS. 1-3, adhesive applicator apparatus 100 in accordance with an embodiment is provided for applying adhesive to an outer circumferential surface of a cylindrical compressor liner 110 having a longitudinal central axis 112 (which extends into and out of the page looking at FIG. 2). The longitudinal central axis 112 lies in a first horizontal plane 116 (which also extends into and out of the page looking at FIG. 2). Apparatus 100 comprises adhesive sink 120 filled with adhesive 122. Adhesive 122 comprises anaerobically curable material such as urethane methacrylate. The specific gravity of adhesive is substantially 1.2 at substantially 25 degrees Centigrade. Accordingly, the density of adhesive 122 is substantially 1.2 grams/centimeters$^3$ (g/cm$^3$) or 0.0012 grams/millimeters$^3$ (g/mm$^3$). The viscosity of adhesive 122 is between about 450 centipoise (cP) and about 750 cP. In a disclosed embodiment, adhesive 122 comprises LOCTITE® 640™ available from Henkel of America, Inc. of Rocky Hill, Conn., United States of America. In alternative embodiments, other types of adhesive materials can be used.

Apparatus further comprises first roller 130 having a longitudinal central axis 132 (which extends into and out of the page looking at FIG. 2). First roller 130 is an adhesive applicator roller. First roller 130 has an outer circumferential surface which is immersed in the adhesive 122 in adhesive sink 120. The longitudinal central axis 132 of first roller 130 is parallel to the longitudinal central axis 112 of compressor liner 110. The longitudinal central axis 132 lies in a second horizontal plane 136 which is parallel to the first horizontal plane 116.

Apparatus 100 also comprises second roller 140 having a longitudinal central axis 142 (which extends into and out of the page looking at FIG. 2). Second roller 140 is radially spaced apart from first roller 130. The longitudinal central axis 142 lies in a third horizontal plane 146 which is parallel to and lies between the first and second horizontal planes 116, 136. Thus, the longitudinal central axis 142 of second roller 140 is parallel to the longitudinal central axis 132 of first roller 130 and the longitudinal central axis 112 of compressor liner 110. Second roller 140 has a same construction as first roller 130. Second roller 140 has an outer circumferential surface which is not immersed in the adhesive 122 in adhesive sink 120. First and second rollers 130, 140 cooperate to support compressor liner 110 for rotation about its longitudinal central axis 112.

The outer circumferential diameter of first roller 130 and the outer circumferential diameter of second roller 140 are substantially the same diameter. The outer circumferential diameter of each of first and second rollers 130, 140 is substantially 25 millimeters (mm). Each of first and second rollers 130, 140 comprises stainless steel material. In alternative embodiments, other types of roller materials can be used. For examples, brass, nylon, or aluminum are possible other types of roller materials.

Apparatus 100 further comprises drive mechanism 150 (FIG. 1) including constant speed drive portion 152 and synchronizing drive portion 154 which are mounted to and supported by bracket 156 (which is schematically represented in dashed lines in FIG. 1). Constant speed drive portion 152 comprises an electrical motor which rotates first and second rollers 130, 140 about their longitudinal central axes 132, 142 at a constant rotational speed. The constant rotational speed is between about four revolutions per minute (rpm) and about six rpm.

Synchronizing drive portion 154 rotates first and second rollers 130, 140 about their longitudinal central axes 132, 142 in the same rotational direction. As shown by arrows "A" and "B" in FIG. 2, first and second rollers 130 are rotated in the clockwise direction. Synchronizing drive portion 154 includes first gear 161 (FIG. 1) associated with first roller 130, and second gear 162 associated with second roller 140. Second gear 162 is substantially the same construction and size as first gear 161.

Synchronizing drive portion 154 further includes chain 158 which is operatively coupled to gear teeth of each of first and second gears 161, 162. Chain 158 is also operatively coupled to gear teeth of third gear 163 which is directly coupled to output shaft 153 of electrical motor 152. Third gear 163 is substantially the same construction and size as first and second gears 161, 162. Accordingly, electrical motor 152 is operatively coupled through chain 158 and first, second, and third gears 161, 162, 163 to synchronizingly rotate first and second rollers 130, 140 about their longitudinal central axes 132, 142 in the same rotational direction at the constant rotational speed.

Figure 4:
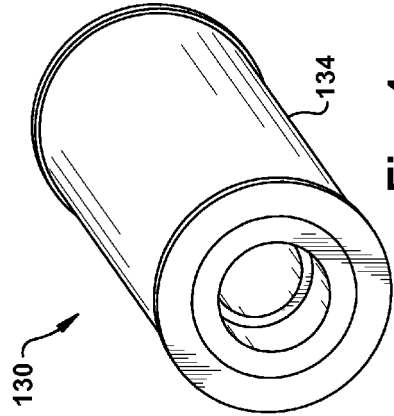
FIG. 4 is a perspective view of an adhesive applicator roller used in the adhesive applicator apparatus of FIG. 1.
Figure 6:
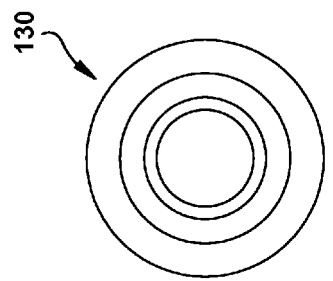
FIG. 6 is an end elevational view of the adhesive applicator roller of FIG. 4.
Figure 5:
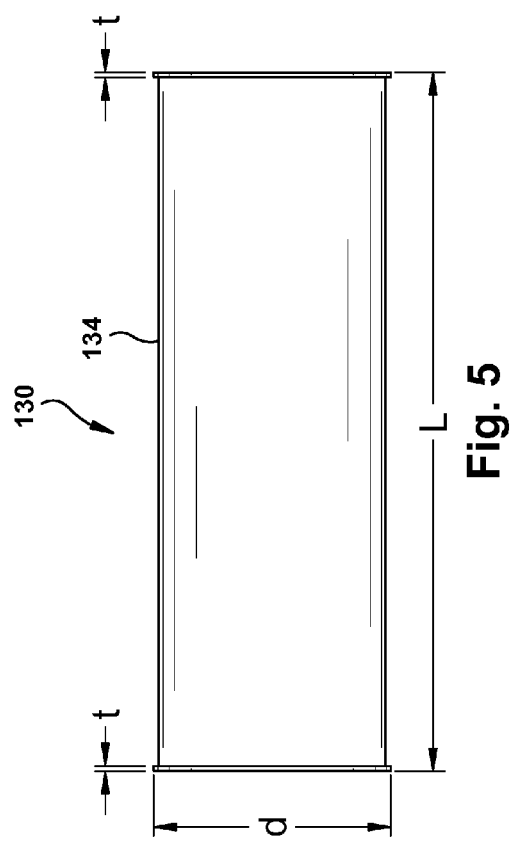
FIG. 5 is a side elevational view of the adhesive applicator roller of FIG. 4.

As best shown in FIG. 3, details of first roller 130 immersed in adhesive 122 in adhesive sink 120 are illustrated. For purposes of clarity, size and dimensions of first roller 130 are shown exaggerated in FIG. 3. Closer-scaled size and dimensions of first roller 130 are illustrated in FIGS. 4, 5, and 6.

The longitudinal length "L" of first roller 130 is substantially 69 mm. The outer diameter "d" of first roller 130 is substantially 25.4 mm. The outer circumferential surface of first roller 130 has a central portion with a stepped groove 134 formed therein. The depth "h" of stepped groove 134 formed in the central portion of the outer circumferential surface of first roller 130 is between about 0.18 mm and about 0.22 mm (i.e., 0.20±10% mm). The thickness "t" of opposite end portions of the outer circumferential surface of first roller 130 formed as a result of the stepped groove 134 is substantially two millimeters.

As shown in FIGS. 1 and 3, O-ring 170 is disposed on end portion 114 of compressor liner 110. Lubricant sink 172 is filled with lubricant 174. O-ring 170 is immersed in the lubricant 174 in lubricant sink 172. Lubricant 174 is a suitable lubricant for O-rings.

During operation of apparatus 100, constant speed drive portion 152 rotates first and second rollers 130, 140 about their longitudinal central axes 132, 142 at the constant rotational speed about their longitudinal central axes 132, 142. At the same time, synchronizing drive portion 154 synchronizes rotation of first and second rollers 130, 140 about their longitudinal central axes 132, 142 in the same rotational direction as shown by arrows "A" and "B" in FIG. 2. When this occurs, compressor liner 110 is rotated in the counter-clockwise direction as shown by arrow "C" in FIG. 2.

While compressor liner 110 is rotating about its longitudinal central axis 112 and first and second rollers 130, 140 are rotating about their longitudinal central axes 132, 142 at the constant rotational speed, only the outer circumferential surface of first roller 130 and not the outer circumferential surface of second roller 140 passes through the adhesive 122 in adhesive sink 120. This occurs because first roller 130 and second roller 140 are offset from each other as a result of first roller 130 lying in the second horizontal plane 136 and second roller 140 lying in the third horizontal plane 146 which is offset from the second horizontal plane 136.

As compressor liner 110 rotates about its longitudinal central axis 112, a consistent weight and uniform layer of adhesive is transferred from the outer circumferential surface of first roller 130 to the outer circumferential surface of compressor liner 110. More specifically, first and second rollers 130, 140 cooperate to spread adhesive which has been brought up from adhesive sink 120 and transferred to the outer circumferential surface of compressor liner 110 to provide the consistent weight and uniform layer of adhesive on the outer circumferential surface of compressor liner 110. At the same time, lubricant is transferred from lubricant sink 172 to O-ring 170 on end portion 114 of compressor liner 110.

Figure 7:
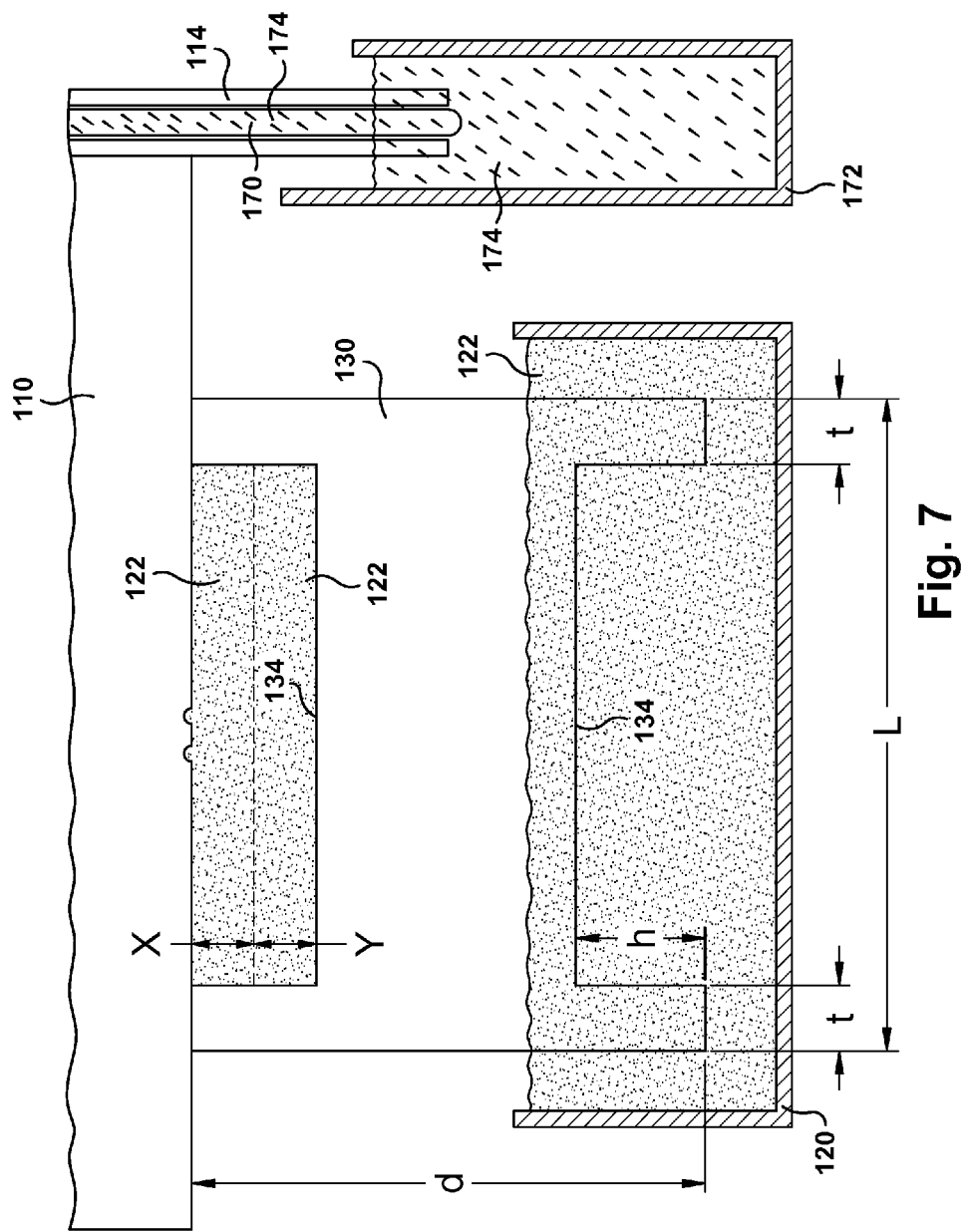
FIG. 7 is a sectional view similar to the sectional view of FIG. 3, and showing an amount of adhesive being transferred from the adhesive applicator roller of FIGS. 4-6 to a cylindrical compressor liner.

Referring to FIG. 7, the thickness "x" of the uniform layer of adhesive transferred to the outer circumferential surface of compressor liner 110 varies as a function of depth "h" of the stepped groove 134. More specifically, the thickness "x" of the uniform layer of adhesive transferred to the outer circumferential surface of compressor liner 110 is substantially one half the depth "h" of the stepped groove 134 formed in the central portion of the outer circumferential surface of first roller 130. Accordingly, if the depth "h" is between about 0.18 mm and about 0.22 mm (i.e., 0.20±10% mm), then the thickness "x" would be between about 0.09 mm and about 0.11 mm. Thus, the thickness "y" of adhesive remaining in the stepped groove 134 is between about 0.09 mm and about 0.11 mm.

The volume of adhesive and the weight of adhesive transferred to the outer circumferential surface of compressor liner 110 can be expressed by the following mathematical equations:

$$\text{Weight} = \text{Volume} \times \rho$$

$$\text{Volume} = \pi\{[(OD+2X)/2]^2 - [OD/2]^2\} \times LE$$

where: Volume is the volume of adhesive transferred;
ρ is the density of the adhesive transferred;
OD is the outer diameter of the compressor liner;
X is the thickness of the adhesive transferred to the outer circumferential surface of the compressor liner; and
LE is the longitudinal extent of the outer circumferential surface of the compressor liner to which adhesive has transferred.

An example set of calculations follows for an adhesive having ρ=1.2 g/cm³=0.0012 g/mm³, a compressor liner having OD=99.35 mm and LE=65 mm, and an adhesive thickness transfer X=0.10 mm (i.e., one half the depth "h" of the stepped groove 134 shown in FIG. 3).

$$\text{Volume} = \pi\{[(99.35+2(0.10))/2]^2 - [99.35/2]^2\} \times 65 = 2030.80 \text{ mm}^3$$

$$\text{Weight} = \text{Volume} \times \rho = (2030.80) \times (0.0012) = 2.44 \text{ g}$$

It should be apparent that first roller 130 is a precisely machined stepped cylinder for applying adhesive to compressor liner 110. The step (i.e., the stepped groove 134) is sized based upon a number of different factors. One factor is the density and the viscosity of the adhesive used. Another factor is the size of the compressor liner to which adhesive is being applied. Still another factor is the desired thickness of adhesive on the compressor liner. The size of the step is a calculated thickness to ensure that the layer of adhesive transferred to the outer circumferential surface of compressor liner 110 is the desired thickness.

It should also be apparent that the rate of rotation (i.e., the constant rotational speed) of first and second rollers 130, 140 is precisely controlled and synchronized to ensure a uniform and even application of adhesive to the outer circumferential surface of compressor liner 110. The rate of rotation of first and second rollers 130, 140 also depends upon the density and the viscosity of the adhesive used.

A number of advantages result by providing adhesive applicator apparatus 100 constructed in accordance with the above-described embodiment. One advantage is that a highly constant amount and uniform thickness of adhesive can be applied to the outer circumferential surface of compressor liner 110.

Another advantage is that a different amount of adhesive or a different layer thickness of adhesive can be obtained by changing the depth of the stepped groove 134 or changing the constant rotational speed of first and second rollers 130, 140, or both.

Yet another advantage is that the adhesive can be applied relatively faster and without dripping, as compared to brushing adhesive onto the outer circumferential surface of compressor liner 110.

Although the above description describes second roller 140 for spreading adhesive on the outer circumferential surface of compressor liner 110, it is conceivable that one or more scrapers can be used in place of second roller 140 to spread the adhesive.

Figure 8:
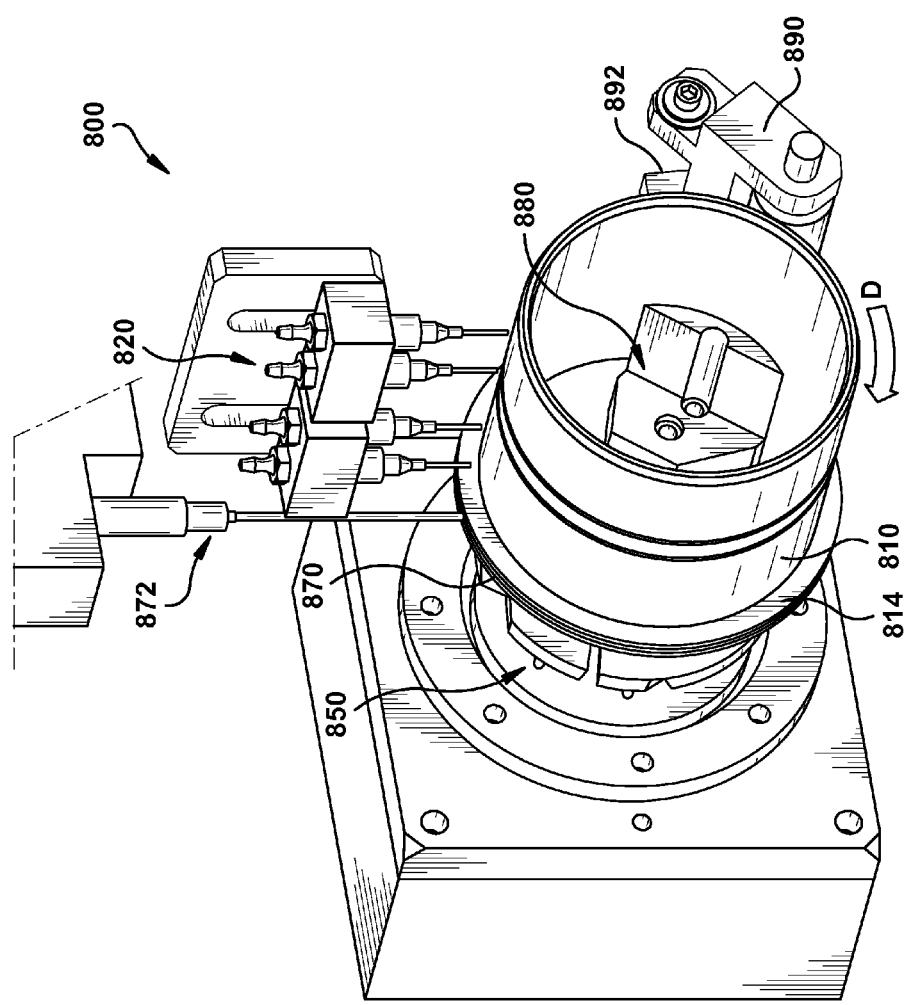
FIG. 8 is a perspective view of an adhesive applicator apparatus for applying adhesive to an outer circumferential surface of a cylindrical compressor liner, and constructed in accordance with another embodiment.
Figure 9:
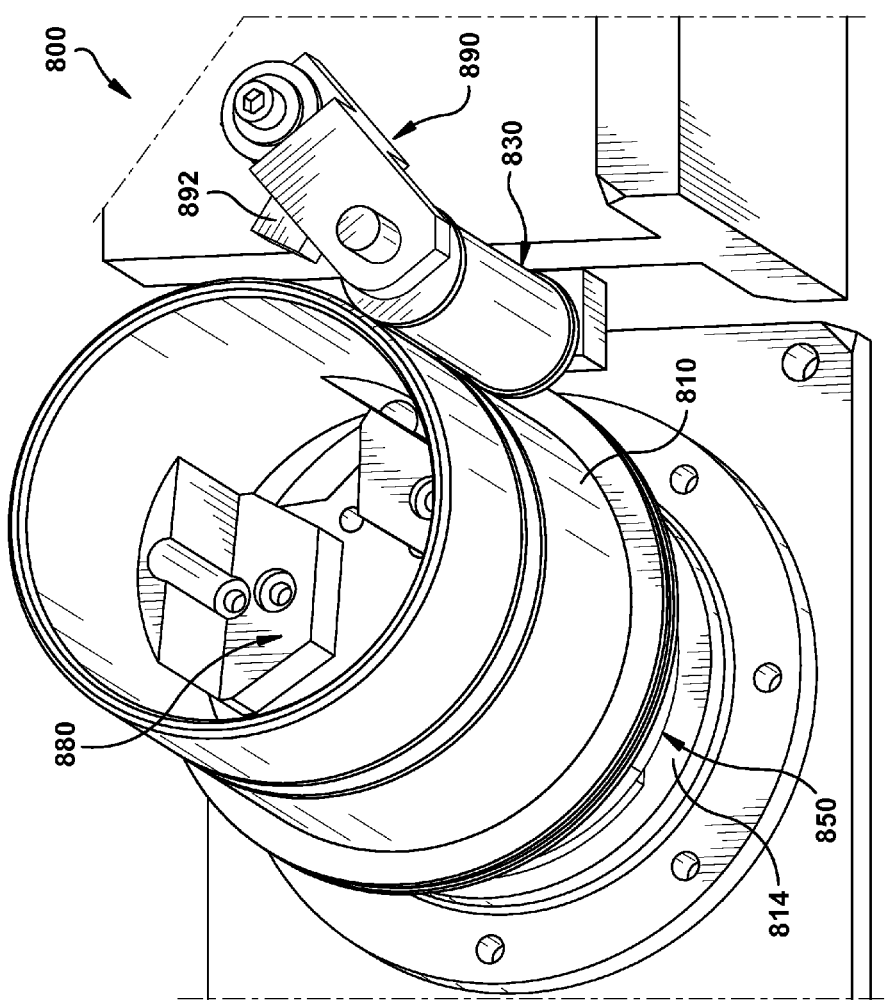
FIG. 9 is an enlarged portion of the perspective view of FIG. 8, and showing certain parts enlarged and from a slightly different vantage point.

Another embodiment is illustrated in FIGS. 8 and 9. Adhesive applicator apparatus 800 comprises holder mechanism 880 for supporting compressor liner 810 for rotation about its longitudinal central axis. Holder mechanism 880 includes at least one hub piece and a spring (not shown) which biases the at least one hub piece against an inner circumferential diameter of compressor liner 810 to support and securely lock compressor liner 810 for rotation about its longitudinal central axis. Holder mechanism 880 functions as a mandrel to which compressor liner 810 is fixed while it is being rotated about its longitudinal central axis.

Adhesive applicator apparatus 800 further comprises first applicator mechanism 820 for applying an adhesive onto the outer circumferential surface of compressor liner 810 as compressor liner 810 is rotating about its longitudinal central axis. First applicator mechanism 820 includes at least one applicator nozzle for applying adhesive onto the outer circumferential surface of compressor liner 810 as compressor liner 810 is rotating about its longitudinal central axis. As an example, four applicator nozzles for first applicator mechanism 820 are shown in FIG. 8. First applicator mechanism 820 is controlled to stop after one full rotation of compressor liner 810 about its longitudinal central axis to minimize wasted adhesive.

The adhesive comprises anaerobically curable material such as urethane methacrylate. The specific gravity of the adhesive is substantially 1.2 at substantially 25 degrees Centigrade. Accordingly, the density of the adhesive is substantially 1.2 g/cm³. The viscosity of the adhesive is between about 450 cP and about 750 cP. In a disclosed embodiment, the adhesive comprises LOCTITE® 640™ available from Henkel of America, Inc. of Rocky Hill, Conn., United States of America. In alternative embodiments, other types of adhesive materials can be used.

Electrical drive mechanism 850 is provided for rotating compressor liner 810 about its longitudinal central axis in direction of arrow "D" shown in FIG. 8. Electrical drive mechanism 850 includes an electrical rotary motor for rotating compressor liner 810 about its longitudinal central axis at a constant rotational speed between about 20 rpm and about 30 rpm.

Second applicator mechanism 872 is provided for applying lubricant onto O-ring 870 disposed on end portion 814 of compressor liner 810 as compressor liner 810 is rotating about its longitudinal central axis. Second applicator mechanism 872 includes at least one applicator nozzle for applying lubricant onto O-ring 870 disposed at end portion 814 of compressor liner 810 as compressor liner 810 is rotating about its longitudinal central axis.

Roller mechanism 890 includes roller 830 for spreading applied adhesive on the outer circumferential surface of compressor liner 810. Roller 830 has same construction as first roller 130 in the embodiment shown in FIGS. 4-6 above. Roller mechanism 890 includes spring 892 which biases roller 830 against the outer circumferential diameter of compressor liner 810. Roller 830 spreads the applied adhesive on the outer circumferential surface of compressor liner 810.

During operation of adhesive applicator apparatus 800, first applicator mechanism 820 applies adhesive onto the outer circumferential surface of compressor liner 810 as electrical drive mechanism 850 rotates compressor liner 810 about its longitudinal central axis at the constant rotational speed. A consistent weight and uniform layer of adhesive is applied to the outer circumferential surface of compressor liner 810. At the same time, second applicator mechanism 872 applies lubricant onto O-ring 870 disposed on end portion 814 of compressor liner 810.

Although the above description describes roller mechanism 890 for spreading adhesive on the outer circumferential surface of compressor liner 810, it is conceivable that one or more scrapers can be used in place of roller mechanism 890 to spread the adhesive.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method of applying adhesive to an outer circumferential surface of a cylindrical compressor liner having a longitudinal central axis, the method comprising:
   supporting the compressor liner for rotation about its longitudinal central axis by other than a roller;
   rotating the compressor liner at a constant rotational speed about its longitudinal central axis;
   applying an adhesive onto the outer circumferential surface of the compressor liner as the compressor liner is rotating about its longitudinal central axis; and
   by a spring-loaded roller biased against the outer circumferential surface of the compressor liner, spreading the applied adhesive on the outer circumferential surface in a manner to apply a consistent weight and uniform layer of adhesive to the outer circumferential surface while adhesive is being applied onto the outer circumferential surface and the compressor liner is being rotated at the constant rotational speed about its longitudinal central axis.

2. A method according to claim 1, wherein the adhesive comprises an anaerobically curable material.

3. A method according to claim 2, wherein the adhesive comprises urethane methacrylate.

4. A method according to claim 1, wherein the constant rotational speed is between about 20 revolutions per minute (rpm) and about 30 rpm.

5. A method according to claim 1, wherein supporting the compressor liner for rotation about its longitudinal central axis by other than a roller includes supporting the compressor liner by a spring-loaded holder.

6. A method according to claim 1, wherein rotating the compressor liner at a constant rotational speed about its longitudinal central axis includes rotating the compressor liner by an electrical motor.

7. A method according to claim 1, wherein applying an adhesive onto the outer circumferential surface of the compressor liner includes applying the adhesive by at least one applicator nozzle.

8. A method according to claim 1, wherein the thickness of the uniform layer of adhesive transferred to the outer circumferential surface of the compressor liner is substantially one half the depth of a stepped groove formed in a central portion of the outer circumferential surface of the spring-loaded roller.

9. A method according to claim 8, wherein the depth of the stepped groove is between about 0.18 mm and about 0.22 mm.

10. A method according to claim 9, wherein the outer circumferential diameter of the spring-loaded roller is substantially 25 millimeters (mm).

11. A method of applying adhesive to an outer circumferential surface of a cylindrical compressor liner having a longitudinal central axis, the method comprising:
    supporting the compressor liner for rotation about its longitudinal central axis by other than a roller;
    rotating the compressor liner about its longitudinal central axis;
    applying an adhesive onto the outer circumferential surface of the compressor liner as the compressor liner is rotating about its longitudinal central axis; and
    by a spring-loaded roller biased against the outer circumferential surface of the compressor liner, spreading the applied adhesive on the outer circumferential surface in a manner to apply a consistent weight and uniform layer of adhesive to the outer circumferential surface as adhesive is being applied onto the outer circumferential surface and the compressor liner is being rotated about its longitudinal central axis.

12. A method according to claim 11, wherein the adhesive comprises an anaerobically curable material.

13. A method according to claim 12, wherein the adhesive comprises urethane methacrylate.

14. A method according to claim 11, wherein rotating the compressor liner about its longitudinal central axis includes rotating the compressor liner at a constant rotational speed which is between about 20 revolutions per minute (rpm) and about 30 rpm.

15. A method according to claim 11, wherein supporting the compressor liner for rotation about its longitudinal central axis by other than a roller includes supporting the compressor liner by a spring-loaded holder.

16. A method according to claim 11, wherein rotating the compressor liner about its longitudinal central axis includes rotating the compressor liner by an electrical motor.

17. A method according to claim 11, wherein applying an adhesive onto the outer circumferential surface of the compressor liner includes applying the adhesive by at least one applicator nozzle.

18. A method according to claim 11, further comprising applying lubricant onto an O-ring that is disposed at an end portion of the compressor liner as the compressor is rotating about its longitudinal central axis, wherein applying lubricant onto the O-ring includes applying lubricant by at least one applicator nozzle.

19. A method according to claim 11, wherein spreading the applied adhesive on the outer circumferential surface includes spreading the applied adhesive by a spring-loaded roller biased against the outer circumferential surface of the compressor liner.

20. A method according to claim 11, wherein the thickness of the uniform layer of adhesive applied to the outer circumferential surface of the compressor liner is substantially one half the depth of a stepped groove formed in a central portion of the outer circumferential surface of the spring-loaded roller.

21. A method according to claim 20, wherein the depth of the stepped groove is between about 0.18 mm and about 0.22 mm.

22. A method according to claim 21, wherein the outer circumferential diameter of the spring-loaded roller is substantially 25 millimeters (mm).

* * * * *